United States Patent [19]
Lemieux

[11] Patent Number: 5,173,084
[45] Date of Patent: Dec. 22, 1992

[54] SELF-CLAMPING ASSIST FOR "V" BELT CONTINUOUSLY VARIABLE TRANSMISSIONS

[75] Inventor: George E. Lemieux, Northville, Mich.

[73] Assignee: Ford Motor Company, Dearborn, Mich.

[21] Appl. No.: 812,400

[22] Filed: Dec. 23, 1991

[51] Int. Cl.[5] ............................................. F16H 59/00
[52] U.S. Cl. ........................................................ 474/8
[58] Field of Search .................. 474/8, 11, 12, 17, 28, 474/43, 44

[56] References Cited

U.S. PATENT DOCUMENTS

| | | | |
|---|---|---|---|
| 2,651,208 | 9/1953 | Karig | 74/230.17 |
| 4,116,080 | 9/1978 | Berens | 74/230.17 A |
| 4,360,353 | 11/1982 | Hattori et al. | 474/12 |
| 4,487,595 | 12/1984 | Quick et al. | 474/15 |
| 4,515,040 | 5/1985 | Takeuchi et al. | 74/866 |
| 4,515,575 | 5/1985 | Kinbara et al. | 474/13 |
| 4,541,820 | 9/1985 | Sakakibara | 474/8 X |
| 4,541,821 | 9/1985 | Sakakibara | 474/17 |
| 4,557,705 | 12/1985 | Shimizu | 474/13 |
| 4,605,386 | 8/1986 | Harris | 474/8 |
| 4,717,368 | 1/1988 | Yamaguchi et al. | 474/28 |
| 4,731,044 | 3/1988 | Mott | 474/8 |
| 4,735,113 | 4/1988 | Yamamuro et al. | 74/866 |
| 4,747,808 | 5/1988 | Moan | 474/28 |
| 4,752,277 | 6/1988 | Morimoto | 474/18 |
| 4,753,627 | 6/1988 | Kawamoto | 474/18 |
| 4,946,424 | 8/1990 | Sakakibara et al. | 474/11 |
| 4,973,288 | 11/1990 | Sakakibara et al. | 474/8 |

Primary Examiner—Thuy M. Bui
Attorney, Agent, or Firm—Roger L. May; Frank G. McKenzie

[57] ABSTRACT

A continuously variable transmission is provided comprising a driving sheave mounted on a driving shaft, a driven sheave mounted on a driven shaft, and an endless V-belt for transmitting torque between the shafts. The driving sheave includes first and second sheave members, and the driven sheave includes third and fourth sheave members. A first plurality of angularly spaced apart helical ramps formed in the driving shaft contain rolling elements which cooperate with the first sheave member. Upon application of torque through the driving shaft, the first sheave member is axially biased toward the second sheave member like the translation of a nut on a threaded screw. A similar arrangement on the driven shaft axially biases the third sheave member toward the fourth sheave member upon application of torque through the driven sheave.

15 Claims, 3 Drawing Sheets

SELF-CLAMPING ASSIST FOR "V" BELT CONTINUOUSLY VARIABLE TRANSMISSIONS

TECHNICAL FIELD

This invention relates to continuously variable transmissions, and more particularly to an apparatus for developing the required traction force at a continuously variable transmission belt/sheave interface utilizing rolling elements disposed in helical ramps in a driving and a driven shaft.

BACKGROUND ART

To develop the traction or clamping force required at the belt/sheave interface of a continuously variable transmission (CVT), a pump is conventionally used to generate hydraulic pressure which biases a movable sheave member toward an opposed sheave member. Another recognized method of developing the clamping force is through the use of a cooperating ball and camming surface arrangement. In U.S. Pat. No. 2,651,208 to Karig, for instance, the torque from an input shaft forces various balls against angularly arranged cam surfaces provided on a movable pulley sheave to thereby produce an axial force component on the sheave. U.S. Pat. No. 4,116,080 to Berens discloses an infinitely variable transmission in which rolling elements subject to centrifugal force bear against an inclined abutment surface and generate an axial force component to assist in the clamping force of pulley sheaves.

It is also known to use the radial displacement of a weight against an inclined surface to generate the axial clamping force. This radial displacement occurs when the shafts upon which the sheaves are mounted rotate. For example, U.S. Pat. No. 4,360,353 to Hattori et al discloses a torque transmission system in which flyweights in a driven pulley unit are radially displaced by centrifugal force. The driven pulley unit is axially shifted by the axial force component of the flyweights bearing against inclined surfaces. Similarly, U.S. Pat. No. 4,487,595 to Quick et al discloses a pulley construction for a V-belt having a speed responsive unit for moving a flange axially relative to another flange. As the speed of rotation of the pulley construction increases, steel balls are thrown outwardly by a greater centrifugal force. The balls move outward in tracks to cause a pulley flange to be axially moved toward an opposite pulley flange. Also, U.S Pat. No. 4,515,575 to Kinbara et al discloses a torque transmission system in which the movable pulley part of the driven pulley unit is axially shifted by the action of flyweights. When the flyweights are centrifugally moved toward their radially outermost positions, an axial thrust force is imparted to the movable pulley part by the flyweight bearing against inclined surfaces.

A problem with the displacement of weights, however, is that the weights may quickly shift position upon application or reversal of torque. The consequent impact of the weights with their retaining surfaces results in backlash which can damage the CVT.

SUMMARY OF THE INVENTION

It is an object of the present invention to provide an apparatus for transmitting torque from a driving shaft to a driven shaft comprising a driving sheave having at least one axially movable sheave member which cooperates with a plurality of rolling elements disposed in helical ramps in a driving shaft to develop a clamping force on the V-belt of a continuously variable transmission.

It is another object of the present invention to provide an apparatus of the type described above which reduces the contribution required from a hydraulic pump to develop the clamping force.

It is yet another object of the present invention to provide an apparatus of the type described above which uses torque at the input and at the output of a V-belt type continuously variable transmission to help in the clamping of the sheaves on the belt to develop the required level of traction.

It is another object of the present invention to provide an apparatus of the type described above which reduces backlash.

In carrying out the above objects and other objects of the present invention, an apparatus is provided for transmitting torque from a driving shaft to a driven shaft. The apparatus comprises a driving sheave provided on the driving shaft, a driven sheave provided on the driven shaft, and an endless V-belt received respectively within first and second circumferentially continuous grooves defined in the driving and driven sheaves. The driving sheave includes first and second sheave members rotatable with the driving shaft and which define the first circumferentially continuous groove. The driving sheave also includes means for maintaining the first and second sheave members rotationally fixed with respect to each other, a first plurality of angularly spaced apart helical ramps formed in the driving shaft, and a plurality of rolling elements disposed in the first helical ramps which cooperate with the first sheave member. Upon application of torque through the driving shaft, the first sheave member is axially biased toward the second sheave member.

The driven sheave includes third and fourth sheave members rotatable with the driven shaft and which define a second circumferentially continuous groove. The driven sheave also includes means for maintaining the third and fourth sheave members rotationally fixed with respect to each other, another plurality of angularly spaced apart helical ramps formed in the driven shaft, and a plurality of rolling elements disposed in the other helical ramps which cooperate with the third sheave member. Upon application of torque through the third and fourth sheave members, the third sheave member is axially biased toward the fourth sheave member. The V-belt is received respectively within the first and second circumferentially continuous grooves.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

With reference to the drawings, the preferred embodiments of the present invention will be described.

Figure 1:
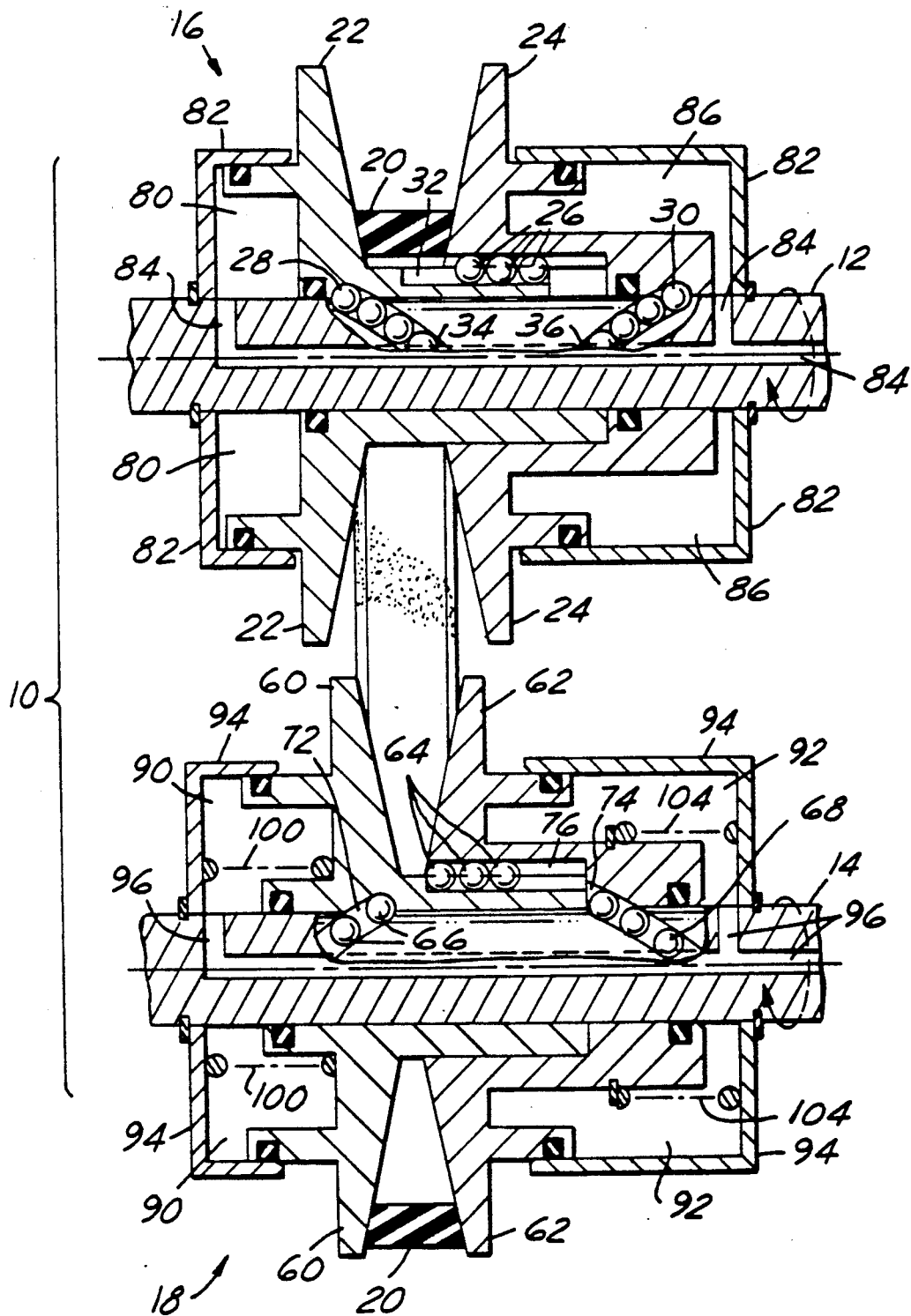
FIG. 1 is a partial cross-sectional view of a first embodiment of the apparatus for transmitting torque from a driving shaft to a driven shaft in accordance with the present invention.

FIG. 1 shows an apparatus 10 for transmitting torque from an input or driving shaft 12 to an output or driven shaft 14. The apparatus comprises a driving sheave 16 provided on the driving shaft 12, a driven sheave 18 provided on the driven shaft 14, and means for transmitting torque between the sheaves such as an endless chain or V-belt 20.

The driving sheave 16 includes first and second sheave members 22 and 24, a plurality of rolling elements or balls 26, a plurality of rolling elements or balls 28, and a plurality of rolling elements or balls 30. The first sheave member 22 and the second sheave member 24 are rotatable with the driving shaft 12 about a first axis. Together, they define a first circumferentially continuous groove between their opposed angled faces The balls 26 are disposed in axially aligned ramps or grooves 32 formed between the underside of the second sheave member 24 and an extension of the first sheave member 22. The balls 26 cooperate with the first and second sheave members, and function as splines to maintain the sheave members rotationally fixed with respect to each other. Preferably, there are three of these ball splines spaced equilangularly about the circumference of the driving shaft 12.

The balls 28 are disposed in each of three helical ramps 34 spaced equilangularly apart around the driving shaft 12. The balls 28 cooperate with matching grooves on the underside of the first sheave member 22 such that upon application of torque through the driving shaft 12 in the clockwise direction (as indicated by the arrow), the first sheave member 22 is axially biased toward the second sheave member 24. This result is analogous to the drawing or tightening movement of a nut upon the rotation of a right hand screw. The magnitude of the axial thrust component is dependent on the angle the helical ramp forms with the circumference of the shaft. The clamping force thus developed is, however, proportional to the torque applied through the driving shaft 12, rather than the rotational speed of the shaft.

The balls 30 are disposed in each of three helical ramps 36 formed equilangularly apart in the driving shaft 12 in the opposite direction of ramps 34. The balls 30 cooperate With matching grooves on the underside of the second sheave member 24 in the manner of a left hand screw. Thus, the second sheave member 24 is axially biased toward the first sheave member 22 at the same time the first sheave member is biased toward it upon application of torque through the driving shaft in the clockwise direction.

The construction of the driven sheave 18 is similar to the construction of the driving sheave 16. The driven sheave 18 includes third and fourth sheave members 60 and 62, a plurality of rolling elements or balls 64, a plurality of rolling elements or balls 66, and a plurality of rolling elements or balls 68. The third sheave member 60 and the fourth sheave member 62 are rotatable with the driven shaft 14 about a second axis, and define a second circumferentially continuous groove between their opposed angled faces. The V-belt 20 is received respectively within the first circumferentially continuous groove of the driving sheave 16 and the second circumferentially continuous groove of the driven sheave 18.

The balls 64 are disposed in axially aligned ramps or grooves 76 formed between the underside of the fourth sheave member 62 and an extension of the third sheave member 60. The balls 64 cooperate with the third and fourth sheave members, and function as splines to maintain them rotationally fixed with respect to each other. As with the ball splines 26 on the driving shaft 12, there are preferably three of the ball splines 64 spaced equilangularly around the circumference of the driven shaft 14.

The balls 66 are disposed each of three helical ramps 72 spaced equilangularly apart in the driven shaft 14. The balls 66 cooperate with matching grooves on the underside of the third sheave member 60 such that upon application of torque through the V-belt 20 and through the third and fourth sheave members 60 and 62, the third sheave member 60 is axially biased toward the fourth sheave member 62. This is analogous to the clockwise rotation and consequent tightening of a nut upon a left hand screw.

The balls 68 are disposed in each of three helical ramps 74 formed equilangularly apart in the driven shaft 14. The ramps 74 extend in the direction opposite to the direction of the ramps 72. The balls 68 again cooperate with matching grooves on the underside of the fourth sheave member 62 in the manner of a right hand screw. Thus, the fourth sheave member 62 is axially biased toward the third sheave member 60 at the same time the third sheave member is biased toward it upon application of torque through the third and fourth sheave members 60 and 62.

When the sheave members 22 and 24 are biased toward each other, the gap between the opposed angled faces of the sheave members is narrowed, and the V-belt 20 is forced higher in the first groove. At the same time, the V-belt sinks lower in the second groove formed in the driven sheave 18, i.e. the pitch radius decreases. This displacement obtains the different ratios for the CVT.

If the torque through the driving shaft 12 is lessened, for instance during coasting of a motor vehicle, the sheave members 22 and 24 will tend to be biased away from each other, lightening the clamping force on the V-belt 20 produced by the balls 28 and 30. However, because the balls are not subject to radial displacement, and can only move a limited distance within the helical ramps as dictated by manufacturing tolerances, backlash is minimized. For the lessened torque situation, other means for axially biasing the first and second sheave members toward each other to produce the requisite clamping force is provided in the form of hydraulic pressure. A cylinder 80 is defined by the outside edge of the first sheave member 22 and a relatively stationary housing such as driving sheave housing 82. The cylinder 80 is in fluid communication with a source of fluid such as oil through passage 84 which extends through the driving shaft 12. A pump (not shown) forces fluid through the passage 84 and into the cylinder 80, thereby generating sufficient hydraulic pressure to force the sheave member 22 more tightly against the V-belt 20. A similar cylinder 86 defined between the outside edge of the second sheave member 24 and the driving sheave housing 82 also accepts hydraulic fluid through the passage 84. The hydraulic pressure thus generated biases the second sheave member 24 toward the first sheave member 22.

Hydraulic pressure of a magnitude different from that described above is also developed and routed to cylinders 90 and 92. The cylinders 90 and 92 are defined by the outside edges of the third and fourth sheave members 60 and 62, respectively, and a relatively stationary housing such as driven sheave housing 94. These cylinders 90 and 92 are likewise in fluid communication with the source of fluid through a passage 96. The pump forces fluid through these passages and into the cylinders 90 and 92, thereby generating sufficient hydraulic pressure to force the sheave members 60 and 62 more tightly against the belt 20. The hydraulic pressure in the cylinders 90 and 92 is maintained at a level sufficient to eliminate slippage, while the hydraulic pressure in cylinders 80 and 86 is maintained at a level sufficient to overcome that in the cylinders 90 and 92 for ratio control purposes. A separate valve body (not shown) regulates these different pressures according to factors such as engine output torque, road speed, and driver demands.

The contribution from hydraulic pressure necessary to develop the clamping forces on the V-belt 20 is reduced by the amount of force produced by the ball ramps. Thus, a conventional pump can be simplified in design or reduced in capacity. Alternatively, hydraulic pressure capacity can be maintained, but the piston area exposed to pressure in the cylinders can be lowered. Because the clamping force required from hydraulic pressure is lowered in either event, the ratio change time of the CVT is improved.

Springs 100 and 104 are provided in the driven sheave as means for axially biasing the third and fourth sheave members toward each other to reduce any belt slack, and to assist in achieving maximum numerical ratio during vehicle start up The spring 100 extends between the outside face of the third sheave member 60 and the housing 94 of the driven sheave 18. The spring 104 extends between the outside edge of the fourth sheave member 62 and the opposite side of the driven sheave housing 94.

Preferably, a reverse drive device (not shown) is located downstream from the driven sheave 18. This obviates the need for higher pressure requirements in the cylinders which would be necessary if the reverse drive device were upstream of the driving sheave 16.

Figure 2:
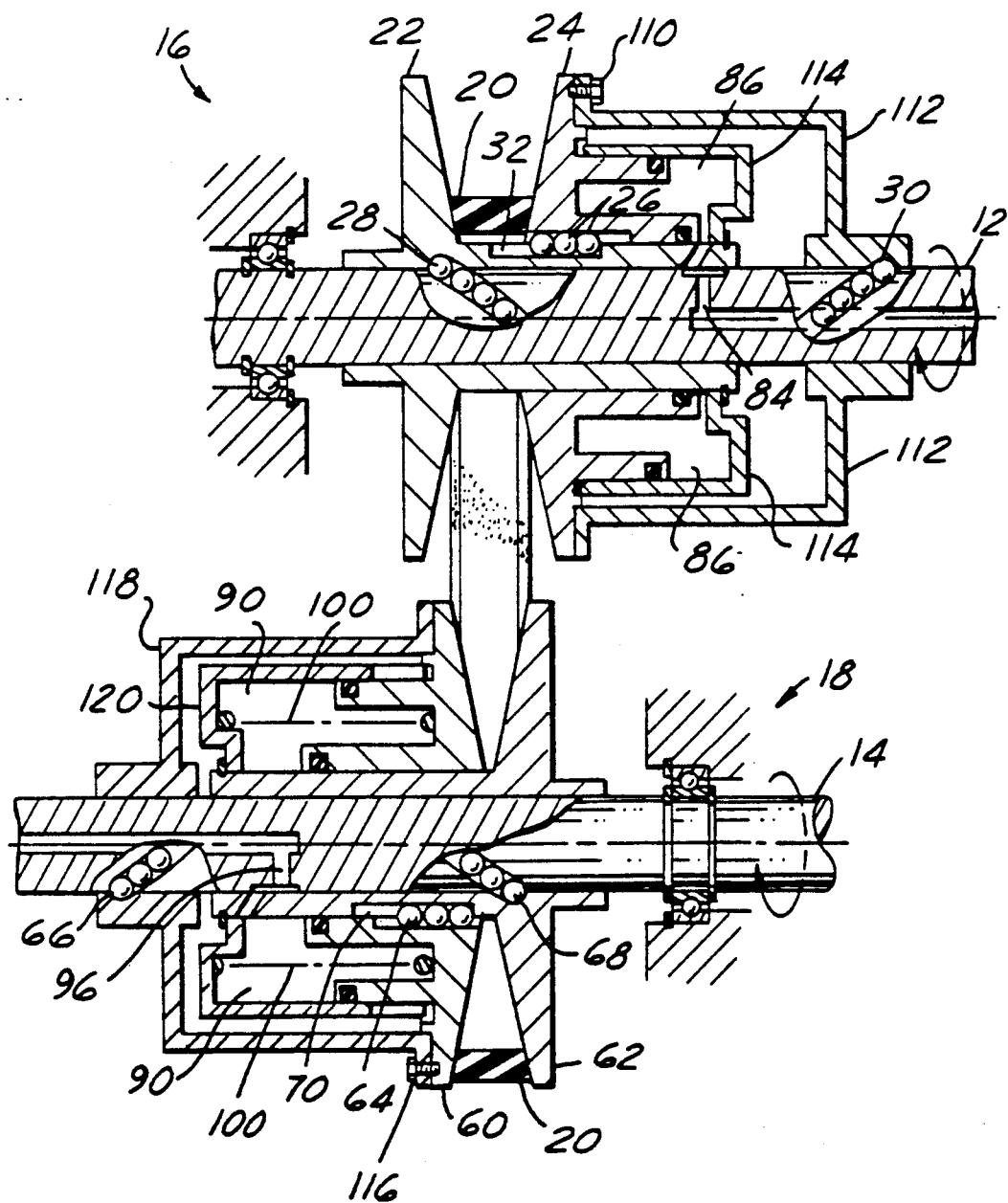
FIG. 2 is a partial cross-sectional view of a second embodiment of the apparatus for transmitting, torque from a driving shaft to a driven shaft according to the present invention.

FIG. 2 shows an alternative embodiment of the present invention having a single piston/cylinder arrangement on each shaft. The second sheave member 24 is fixed by means such as bolts 110 to a casing 112, which in turn engages the balls 30. The first sheave member 22 cooperates with the balls 28 as in the first embodiment, such that application of torque through the driving shaft 12 in the direction indicated biases the sheave members 22 and 24 toward each other, and creates a clamping force on the V-belt 20. The cylinder 86 is formed between the outside of the second sheave member 24 and a housing 114 which is fixed at its radially inward end to the first sheave member 22. Hydraulic pressure in the cylinder 86 causes the sheave members 22 and 24 to translate toward each other, adding to the traction on the V-belt 20.

Similarly, the third sheave member 60 is fixed by bolts 116 to a casing 118, which in turn engages the balls 66. The fourth sheave member 62 cooperates with the balls 68 as in the first embodiment, such that application of torque through the third and fourth sheave members biases them toward each other. The cylinder 90 is formed between the outside of the third sheave member 60 and a housing 120 which is fixed at its radially inward end to the fourth sheave member 62. Hydraulic pressure in the cylinder 90 contributes to the force clamping the sheave members 60 and 62 on the V-belt 20.

Figure 3:
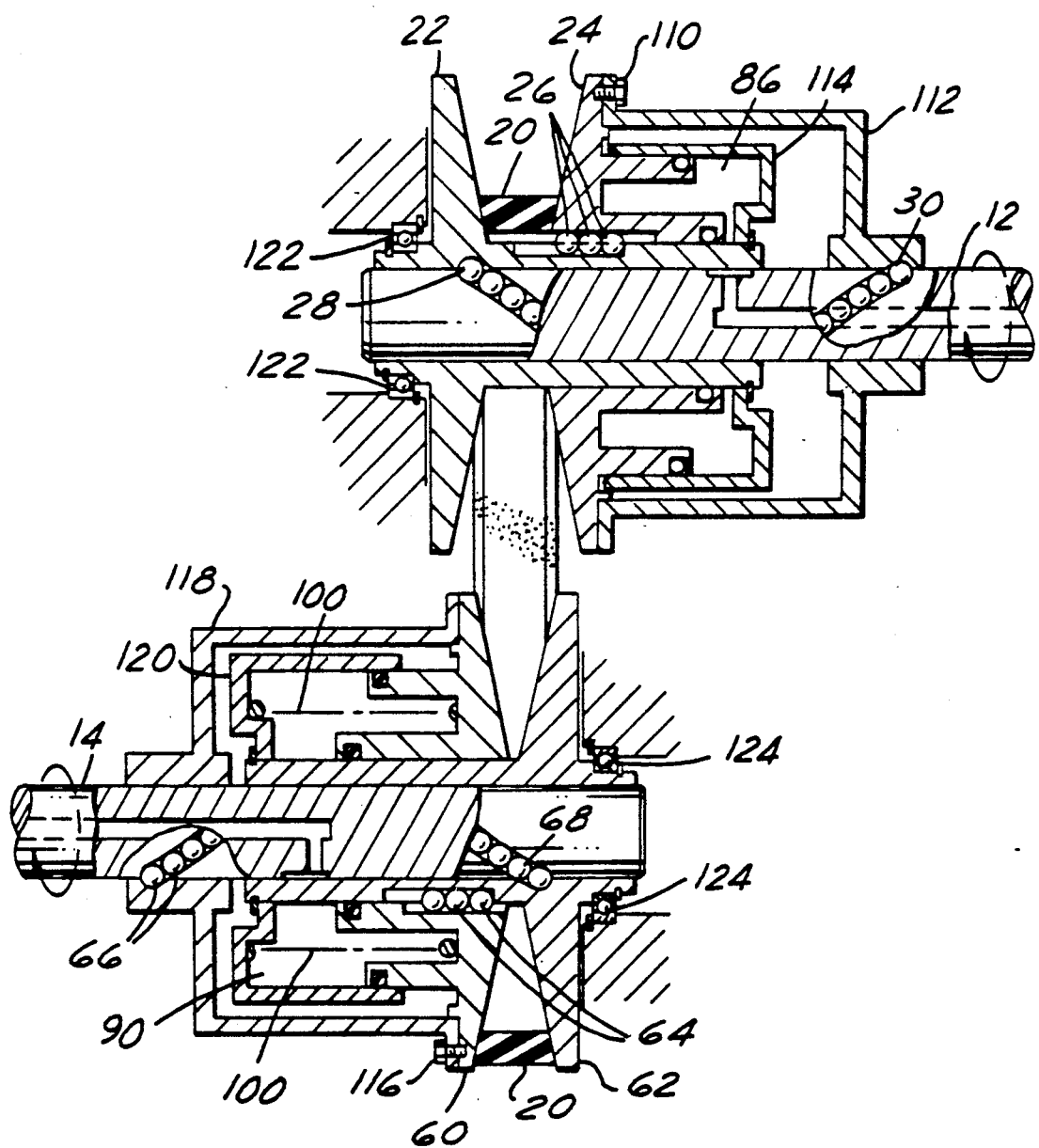
FIG. 3 is a partial cross-sectional view of a third embodiment of the apparatus for transmitting torque from a driving shaft to a driven shaft according to the present invention.

FIG. 3 shows another alternative embodiment of the present invention in which the second sheave member 24 and the third sheave member 60 are relatively fixed against axial movement with respect to the shafts 12 and 14. Bearing mounts 122 fix the first sheave member 22 to the driving shaft 12, while bearing mounts 124 so fix the fourth sheave member 62. The housings 114 and 120 are thus relatively stationary. Hydraulic pressure in the cylinders 86 and 9 therefore forces only the sheave members 24 and 60 onto the V-belt 20. Because the movable sheave members are on opposite sides of the V-belt 20, the V-belt assumes a non-vertical position at some points. Sheave member cooperation with the balls is the same as the second embodiment described above.

It should be understood that while the forms of the invention herein shown and described constitute preferred embodiments of the invention, they are not intended to illustrate all possible forms thereof. It also should be understood that the words used are words of description rather than limitation, and various changes may be made without departing from the spirit and scope of the invention disclosed.

I claim:

1. Apparatus for transmitting torque from a driving shaft to a driven shaft, the apparatus comprising:
   a driving sheave provided on the driving shaft and including a first sheave member rotatable with the driving shaft, a second sheave member rotatable with the driving shaft, the first and second sheave members defining a first circumferentially continuous groove, means for maintaining the first and second sheave members rotationally fixed with respect to each other, a first plurality of angularly spaced apart helical ramps formed in the driving shaft, and a plurality of rolling elements disposed in each of the first helical ramps and cooperating with the first sheave member such that the first sheave member is axially biased toward the second sheave member upon application of torque through the driving shaft;
   a driven sheave provided on the driven shaft and including a third sheave member rotatable with the driven shaft, a fourth sheave member rotatable with the driven shaft, the third and fourth sheave members defining a second circumferentially continuous groove, and means for maintaining the third and fourth sheave members rotationally fixed with respect to each other; and
   means for transmitting torque between the driving sheave and the driven sheave.

2. The apparatus of claim 1 further comprising a second plurality of angularly spaced apart helical ramps formed in the driving shaft, and a plurality of rolling elements disposed in each of the second helical ramps and cooperating with the second sheave member such that the second sheave member is axially biased toward the first sheave member upon application of torque through the driving shaft.

3. The apparatus of claim 1 further comprising a third plurality of angularly spaced apart helical ramps formed in the driven shaft, and a plurality of rolling ,elements disposed in each of the third helical ramps and cooperating with the third sheave member such that the third sheave member is axially biased toward the fourth sheave member upon application of torque through the third and fourth sheave members.

4. The apparatus of claim 1 further comprising a fourth plurality of angularly spaced apart helical ramps formed in the driven shaft, and a plurality of rolling elements disposed in each of the fourth helical ramps and cooperating with the fourth sheave member such that the fourth sheave member is axially biased toward the second sheave member upon application of torque through the third and fourth sheave members.

5. The apparatus of claim 1 further comprising hydraulic means for axially biasing the first sheave member toward the second sheave member.

6. The apparatus of claim 5 wherein the hydraulic means for axially biasing the first sheave member toward the second sheave member comprises a cylinder defined by the first sheave member and a relatively stationary housing, the cylinder being in fluid communication with a source of fluid, the first sheave member being biased toward the second sheave member upon the generation of sufficient hydraulic pressure in the cylinder.

7. The apparatus of claim 1 further comprising hydraulic means for axially biasing the third sheave member toward the fourth sheave member.

8. The apparatus of claim 7 wherein the hydraulic means for axially biasing the third sheave member toward the fourth sheave member comprises a cylinder defined by the third sheave member and a relatively stationary housing, the cylinder being in fluid communication with a source of fluid, the third sheave member being biased toward the fourth sheave member upon the generation of sufficient hydraulic pressure in the cylinder.

9. The apparatus of claim 1 further comprising spring means for axially biasing the third sheave member toward the fourth sheave member.

10. The apparatus of claim 9 wherein the spring means for axially biasing the third sheave member toward the fourth sheave member comprises a spring extending between the third sheave member and a relatively stationary housing.

11. The apparatus of claim 1 wherein the means for transmitting torque between the driving sheave and the driven sheave comprises an endless V-belt received respectively within the first and second circumferentially continuous grooves.

12. The apparatus of claim 1 wherein the means for maintaining the first and second sheave members rotationally fixed with respect to each other comprises a plurality of rolling elements disposed in axially aligned ramps spaced angularly about the driving shaft and cooperating with the first and second sheave members.

13. The apparatus of claim 1 wherein the means for maintaining the third and fourth sheave members rotationally fixed with respect to each other comprises a plurality of rolling elements disposed in axially aligned ramps spaced angularly about the driven shaft and cooperating with the third and fourth sheave members.

14. The apparatus of claim 1 wherein the second sheave member is axially fixed with respect to the driving shaft.

15. The apparatus of claim 1 wherein the third sheave member is axially fixed with respect to the driven shaft.

* * * * *